Figure 1:
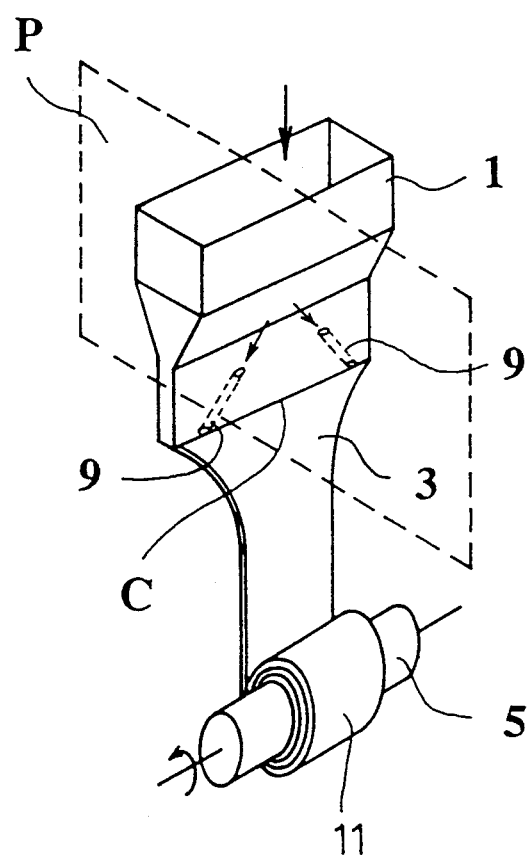

United States Patent [19]

Shinohara et al.

[11] Patent Number: 5,326,510
[45] Date of Patent: Jul. 5, 1994

[54] CARBON COMPOSITE MATERIAL INCORPORATING CARBON FILM, FORMING MATERIAL AND PROCESS FOR PRODUCING THE CARBON FILM

[75] Inventors: Kouji Shinohara, Nara; Juuji Mondori, Hashimoto; Hirofumi Miyanoshita, Sakai; Teruyuki Kurimoto, deceased, late of Nara, all of Japan, by Kurie Kurimoto, legal representative

[73] Assignee: Osaka Gas Company Limited, Osaka, Japan

[21] Appl. No.: 761,872

[22] PCT Filed: Dec. 20, 1990

[86] PCT No.: PCT/JP90/01667

§ 371 Date: Jun. 2, 1992

§ 102(e) Date: Jun. 2, 1992

[87] PCT Pub. No.: WO91/10557

PCT Pub. Date: Jul. 25, 1991

[30] Foreign Application Priority Data

Jan. 17, 1990 [JP] Japan .................................. 2-8928

[51] Int. Cl.$^5$ .................................................. D01F 9/00
[52] U.S. Cl. ................................. 264/29.1; 264/29.7; 264/556
[58] Field of Search ................ 428/408; 264/29.2, 83, 264/177.18, 177.19, 211.11, 211.15, 211.17, 177.13, 177.11, 29.1, 29.7, 556

[56] References Cited

U.S. PATENT DOCUMENTS

| | | | |
|---|---|---|---|
| 1,837,854 | 12/1931 | Esselen | 264/203 |
| 3,825,380 | 7/1974 | Harding et al. | 425/72 |
| 4,054,708 | 10/1977 | Robba et al. | 428/220 |
| 4,628,001 | 12/1986 | Sasaki et al. | 428/367 |
| 4,859,382 | 8/1989 | Haraguchi et al. | 264/29.2 |

FOREIGN PATENT DOCUMENTS

0381475 8/1990 European Pat. Off. .
63-256434 10/1988 Japan .
1-257115 10/1989 Japan .
2-22115 1/1990 Japan .
1366131 11/1974 United Kingdom .

OTHER PUBLICATIONS

Patent Abstracts of Japan, vol. 5, No. 19 (E-044), Feb. 4, 1871; & JP-A-55 146 874 (Nitto Electric Ind. Co., Ltd.), Nov. 11, 1980.
Patent Abstracts of Japan, vol. 15, No. 271 (C-848) [4799], Jul. 10, 1991, JP-A-393 613 (Osaka Gas Co., Ltd.) Apr. 18, 1991.
Patent Abstracts of Japan, vol. 12, No. 471 (M-773) [3318], Dec. 9, 1988; & JP-A-63 194 924 (Kanegafuchi Chem. Ind. Co., Ltd.) Dec. 8, 1988.
Patent Abstracts of Japan, vol. 8, No. 124 (M-301) [1561], Jun. 9, 1984 & JP-A-59 029 124 (Showa Denko K.K.) Feb. 16, 1984.
Patent Abstracts of Japan, vol. 11, No. 300 (C-449) [2747], Sep. 29, 1987; & JP-A-62 090 321 (Sumitomo Metal Ind. Ltd.) Apr. 24, 1987.
Patent Abstracts of Japan, vol. 13, No. 182 (C-591) [3530], Apr. 27, 1989; & JP-A-1 009 866 (Idemitsu Kosan Co., Ltd.) Jan. 13, 1989.
World Patent Index, week 7802, AN=78-03308A, Derwent Publications Ltd., London, GB; & JP-A-52 141 627 (Hitachi K.K.) Nov. 26, 1977.
Polymer Preprints, Japan, vol. 38, No. 12, The Society of Polymer Science, Japan.
JP 62-78220 A; 87.04.10, Haraguchi et al., Published Application with Abstract in English.

Primary Examiner—A. A. Turner
Attorney, Agent, or Firm—Larson and Taylor

[57] ABSTRACT

The present invention provides a carbon composite material diminished in anisotropy and comprising a carbon film and a resin, a forming material comprising the carbon film and the resin for producing the composite material, and a process for producing the carbon film.

9 Claims, 2 Drawing Sheets

CARBON COMPOSITE MATERIAL INCORPORATING CARBON FILM, FORMING MATERIAL AND PROCESS FOR PRODUCING THE CARBON FILM

TECHNICAL FIELD

The present invention relates to carbon composite materials having a carbon film incorporated therein, forming materials or preform for preparing the composite material, and a process for producing the carbon film for use in these materials.

BACKGROUND ART

Carbon fibers, which are lightweight and have properties such as high strength and high elastic modulus, have heretofore been used in carbon fiber-reinforced plastics. Already known as such carbon fiber-reinforced plastics are carbon composite materials which comprise carbon fibers arranged in unidirection and embedded in a matrix resin, for example, in a thermosetting resin or thermoplastic resin. These composite materials have a high strength axially of the carbon fibers. However, the strength ($\sigma T$) in a direction orthogonal to the axial direction of the carbon fibers is dependent largely on the bond strength between the carbon fibers and the matrix resin, and is small and therefore differs greatly from the axial strength ($\sigma L$), hence there is the problem that the material is great in so-called anisotropy (i.e., $\sigma L/\sigma T$). In other words, the composite material has a very high strength in the direction of the orientation of the fibers but has a relatively considerably low strength transverse to the orientation of the fibers. Accordingly, attempts have been made to diminish the anisotropy. For example, so-called unidirectionally reinforced sheets wherein fibers are arranged in parallel in one direction are superposed at varying angles to give an improved strength in a direction perpendicular to the orientation of fibers, or a fabric of carbon fibers is used to afford an improved strength in the direction perpendicular to the orientation of the fibers.

Further more, if the carbon fiber content in the above carbon composite material is adjusted to 70 vol. % or more in an attempt to impart a more improved strength to the material, voids will occur, resulting in a still lower strength in the direction orthogonal to the axes of the carbon fibers and eventually impairing the overall strength of the composite material. It is therefore difficult in the conventional carbon composite material to increase the proportion of carbon fibers for improving the strength, and to diminish anisotropy.

Accordingly, an object of the present invention is to provide a carbon composite material which is low in resin content and which nevertheless has a high mechanical strength and diminished anisotropy.

Another object of the invention is to provide a forming material for giving a carbon composite material which has such excellent characteristics and which is less likely to have voids and excellent in uniformity even when having a low resin content.

DISCLOSURE OF THE INVENTION

To fulfill the above objects, we have conducted intensive research and found that use of a carbon film affords a composite material which is diminished in anisotropy and has a high mechanical strength, whereby the present invention has been accomplished.

More specifically, the above objects of the invention are achieved by a carbon composite material comprising a carbon film and a resin.

Further to attain the above objects, the present invention provides a forming material comprising the carbon film and the resin.

The term "carbon film" as used herein means a carbonized or graphitized, substantially two-dimensional structure.

The term "carbonization" refers to the heat treatment of a carbonizable film, for example, at a temperature of about 1000 to about 2000° C. in a nitrogen gas, carbon dioxide, argon or like inert gas atmosphere. The term "graphitization" refers to the heat treatment of the film, for example, at a temperature of about 2000° to about 3000° C. in an argon gas atmosphere, and the concept of graphitization also includes such a treatment even when the resulting product does not have the crystalline structure of graphite.

The term "forming material" refers to a material comprising a carbon film and a resin in combination and prepared, when required, in the form of a prepreg or in other form.

The term "carbon composite material" refers to a composite obtained by shaping the forming material by the application of pressure and/or heat and to be called, for example, a carbon film-reinforced plastics.

The carbon film to be used can be any of carbon films prepared from materials such as polyacrylonitriles, rayons, phenol resins, celluoses or pitches. Preferable among these carbon films are mesophase pitch-based carbon films having a great modulus of elasticity in tension, especially those having a thickness of about 10 to about 40 μm, preferably having an aspect ratio (width/thickness) of about 10 to about 1000, more preferably about 30 to about 300. In cross section, these carbon films may be of the radial type wherein graphite planes are oriented radially from the center toward the outer surface, the random type wherein graphite planes are randomly oriented, or the onion type wherein graphite planes are oriented in superposed layers along the outer surface. These films can be used singly, or at least two different kinds of films are usable in combination.

The mesophase pitch-based carbon film is much smaller in anisotropy than conventional carbon fibers. More specifically, carbon fibers heretofore used have graphite planes which are oriented axially of the fibers, so that carbon composites are generally about 2000 to about 4500 MPa in strength in the axial direction of the fibers, whereas the strength thereof in the radial direction of the fibers orghogonal to the axial direction is dependent on the bond strength between the carbon fibers and the matrix resin as already stated and is extremely low. The bond strength between the carbon fibers and the matrix resin is generally about 50 to about 70 MPa. In contrast the mesophase pitch-based carbon film for use in the present invention has graphite planes oriented in the form of a plane and is therefore small in the difference between the mechanical strength in the lengthwise direction of the film and that in the widthwise direction thereof, resulting in small anisotropy. For example, the carbon film is about 400 to about 2000 MPa in lengthwise tensile strength $\sigma L$ and about 40 to about 200 MPa in widthwise tensile strength $\sigma T$, and is accordingly small in anisotropy ($\sigma L/\sigma T$). To impart an enhanced bond strength to the resin, one or both surfaces of the carbon film may be subjected to a usual physical, chemical or electrochemical surface treatment depending on the type of resin, for example, to an oxidation treatment or a treatment for forming a metal or like film as by CVD.

The resin to be used is a thermosetting resin, thermoplastic resin or a mixture of these resins. Examples of useful thermosetting resins are epoxy resin, vinyl ester resin, phenol resin, unsaturated polyester, polyimide, polyurethane, diallyl phthlate and the like. These thermosetting resins are used in combination with a conventional curing agent suitable for the kind of resin used. Preferable among these resins are epoxy resin, vinyl ester resin, phenol resin, unsaturated polyester and polyimide. Examples of useful thermoplastic resins are polyethylene, polypropylene, ethylene-vinyl acetate copolymer, acrylic resin, polyethylene terephthalate, polybutylene terephthalate or like polyester, polyacrylonitrile, acrylonitrile-butadiene-styrene copolymer or like styrene polymer, polyacetal, polycarbonate, polyamide, polyphenylene oxide, polyphenylene sulfide, polyarylate, polysulfone, polyethersulfone, polyether ether ketone, polyamide-imide, etc. Preferable among these thermoplastic resins are acrylic resin, polycarbonate, polyamide, polyphenylene sulfide, polyethersulfone, polyether ether ketone and polyamide-imide.

The ratio of the resin to the carbon film is usually 1 to 50 wt. %, preferably about 5 to about 30 wt. %, although variable over a wide range. The carbon film has a smaller surface area than carbon fibers and has a bondable flat portion, greatly reducing the amount of resin to be present in the composite material, such that even if the amount (vol. %) of the carbon film in the material is 70% or more, no voids will occur in the composite material. The carbon film can be present in the form of a plane in the composite material and ensures a reduced resin content. This gives an increased density of carbon film per unit area of the material.

The present invention also provides a forming material for preparing the carbon composite material having a carbon film. The forming material comprises a carbon film, such as the one already described, and a resin in combination. The resin can be one of those mentioned above. When the resin itself is liquid at room temperature, the resin can be used as it is, or when required, as dissolved in an organic solvent capable of dissolving the resin. When in the form of a solid at room temperature, the resin is dissolved before use in an organic solvent capable of dissolving the resin, or is used in a molten state. The thermoplastic resin may be heated along with the carbon film for forming when the resin is in the form of a solid (particles) at room temperature. The resin is used in such an amount that when the forming material of the invention is formed into a carbon composite material, the resin content of the composite is about 1 to about 50 wt. %, preferably about 5 to about 30 wt. %, based on the carbon film.

The forming material of the present invention may be in such a form that the carbon film is present as embedded in the resin. However, the forming material is preferably in the form of a prepreg wherein the resin is present over at least one surface of the carbon film. The prepreg can be prepared by applying the resin at least locally to one or both surfaces of the carbon film, or by impregnating a plurality of carbon films with the resin. Accordingly, the composite material of the invention can be a laminate obtained by laminating such prepregs and forming the resulting assembly into the desired shape.

The carbon films present in the forming material of laminated structure, as well as in the carbon composite material prepared therefrom, may be oriented in one direction or in an oblique or orthogonal direction with respect to each other. Further the films may be arranged helically, or may be in the form of a knitted fabric or in a braided form. The number of laminated carbon films of the composite material having the laminated structure can be selected according to the contemplated use.

The shape of the carbon composite material of the present invention is not limited specifically but can be determined in accordance with the use. For example, the composite material can be in the shape of a solid or hollow cylinder, tube of polygonal cross section, plate such as a flat or curved plate, frame, honeycomb or the like.

The carbon composite material can be formed by the method which is identical with or similar to a conventional common method such as prepreg lamination, filament winding, pulltrusion, automatic lamination or resin injection. In the case where the resin is a thermosetting resin, the resin can be cured during or after the forming process.

The carbon composite material of the present invention is usable for various applications wherein characteristics such as high strength and lightweightness are to be utilized. The material is usable for a wide variety of uses, for example, for use in sporting goods such as golf club shafts, fishing rods and tennis racket frames, for use in medical devices such as artificial limbs, artificial feet, walking sticks, wheelchairs and X-ray diagnostic systems, for use in motor vehicle components such as vehicle bodies, for use in wings and fuselages of aircraft, for use in space such as reflective antennas, solar cell frames, bodies and wings of artificial satellites, and for use in electronic or electric devices.

As described above, the carbon composite material of the present invention includes a carbon film, therefore contains an increased proportion of carbon film relative to the resin and exhibits an enhanced strength. Since the carbon film is small in the difference between the lengthwise strength and the widthwise strength, the composite material is diminished in anisotropy.

In addition to the outstanding characteristics described, the carbon composite material of the invention can be free from voids and has high uniformity even if the resin content is small and the carbon film content is, for example, not lower than 70 vol. %.

The carbon film can be produced from the above-mentioned starting material which can be carbonized or graphitized, for example, by extruding the material into a sheet and carbonizing or graphitizing the sheet. Incidentally, in preparing a pitch-based carbon film, such as the aforementioned mesophase pitch-based carbon film, from a pitch, the pitch is liable to neck down (that is, to reduce in width) when extruded, and is therefore difficult to extrude into a sheet. When such a pitch is to be used, it is desirable to employ the process we have already proposed for the preparation of carbon film (Japanese Patent Application HEI 1-227740). Stated more specifically, mesophase pitch or mesophase pitch containing isotropic pitch is extruded through a nozzle having a slitlike orifice into a sheet, which is then pulled by and wound on a take-up device. To prevent the sheet of pitch from necking down at this time, streams of air, nitrogen or like gas are applied, for example, at a speed of about 50 to about 100 m/sec (the speed at the outlets of gas discharge channels) to the sheet of pitch being reduced in width by the pull in the vicinity of widthwise opposite ends thereof, the gas streams being applied to the sheet in directions to increase the width thereof before the sheet fully solidifies, whereby a pitch film is prepared. The pitch film obtained is then made infusible at a temperature of about 280° to about 340° C. in an oxygen atmosphere and carbonized in an atmosphere of nitrogen, carbon dioxide, argon or the like to prepare a carbonized carbon film. A graphitized carbon film is obtained by graphitizing the infusible film in an argon atmosphere.

Thus the above process is characterized in that spinnable pitch is extruded from a nozzle having a slit into a sheet, which is then pulled by and wound on a take-up device, made infusible and carbonized to produce a tapelike pitch carbon film, wherein gas streams having an outward component and a downward component are applied to the sheet of pitch being reduced in width by the pull in the vicinity of widthwise opposite ends thereof before the sheet of pitch fully solidifies, in directions symmetric with respect to a phantom plane extending through a central point of the slit and perpendicular to a plane in the lengthwise direction of the slit to prepare a tapelike pitch film, which is made infusible and carbonized.

The production process will be described below in greater detail with reference to the accompanying drawings where necessary.

Figure 2:
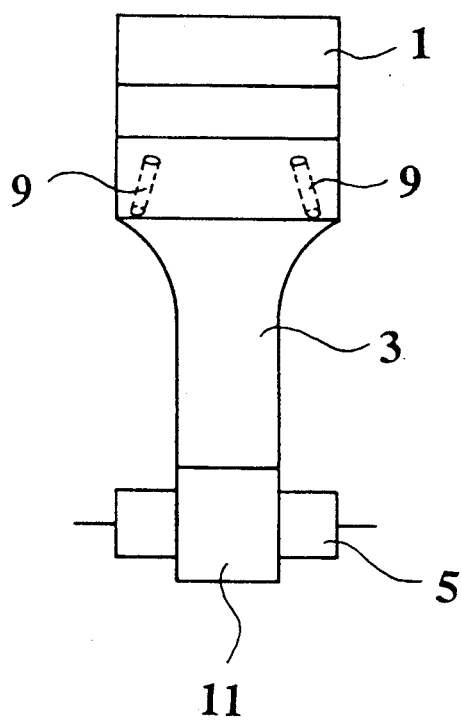
Figure 3:
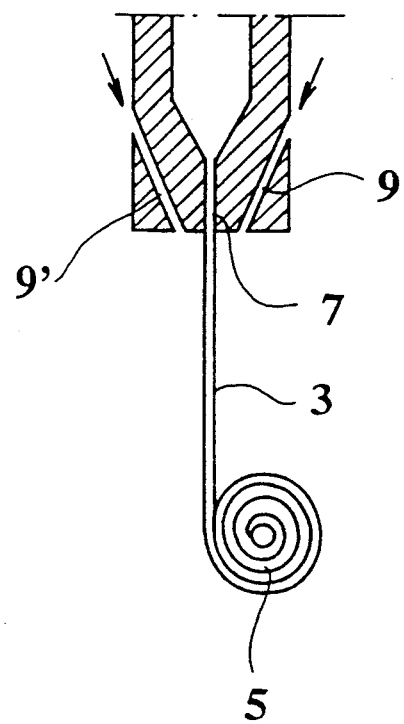

FIG. 1 is a perspective view schematically showing a film production apparatus for practicing the process, FIG. 2 is a front view of the same, and FIG. 3 is a schematic diagram in section emphatically showing a nozzle and gas discharge channels for use in the production process.

The pitch for use in the above process can be either of the coal type or petroleum type. Although the properties of the pitch is not limited specifically, it is generally desirable to use mesophase pitch (which may contain isotropic pitch).

With reference to FIGS. 1 to 3, molten pitch is supplied to an extruder 1 and extruded into a sheet of pitch 3, which is then pulled by and wound on a take-up device 5. The extruder 1 has at least two gas discharge channels 9, 9, through which gas streams having an outward component and a downward component are applied to the sheet of pitch 3 extruded from a nozzle 7 having a slit in the vicinity of widthwise opposite ends thereof. The gas streams are applied to the sheet in directions symmetric with respect to a phantom plane P extending through the center point C of the slit and perpendicular to the lengthwise direction of the slit. With the apparatus shown in FIG. 3, the nozzle 7 has two gas discharge channels 9, 9 in one side portion thereof as shown in FIG. 1, and two gas discharge channels 9', 9' in the other side portion thereof in the same arrangement as in FIG. 1. As seen in FIGS. 1, 2 and 3, gas streams are applied to the sheet of pitch 3 in the vicinity of opposite ends thereof before the sheet of pitch being extruded from the nozzle 7 and being pulled by the take-up device 5 fully solidifies, in other words, when the sheet is positioned immediately below the nozzle 7, causing component forces to act on the sheet of pitch to stretch the sheet widthwise thereof. This inhibits the pitch sheet from necking down, affording tapelike pitch film 11 of increased width. The gas streams are applied preferably at a high speed (the speed at the outlets of the gas discharge channels) of about 50 to about 100 m/sec. The gas is applied preferably at a rate of about 0.4 to about 0.5 liter/min per discharge channel 9. The gas to be applied as the gas streams is air, nitrogen, an exhuast gas resulting from combustion of gas or the like, and is used at a temperature of about 200° to about 400° C. at which the pitch sheet 3 can be drawn by being wound up, preferably at about 250° C. to about 350° C. For the gas to be forced against each surface of the pitch sheet 3 in the vicinity of opposite ends thereof, it is desired to provide the gas discharge channel 9 at at least two locations in the vicinity of the sheet ends, i.e., at least four locations in total.

The pitch film thus obtained (usually with a thickness of about 12 to about 50 $\mu$m and a width of about 2 to about 45 mm) is made infusible and carbonized into a pitch-based carbon film generally in the same manner as in usual methods employed for producing carbon fibers. For example, the film is infusibilized in air at a temperature of about 280° to about 340° C. The time required for infusibilization is of course shorter if the sheet pitch is thinner. The infusibilized sheet is carbonized in an atmosphere of nitrogen, carbon dioxide, argon or the like at a temperature of about 1000° to about 2000° C. When the infusibilized film is to be graphitized, graphitization is effected in an argon atmosphere at a temperature of about 2000° to 3000° C.

The pitch-based carbon film eventually obtained is usually about 10 to about 40 $\mu$m in thickness and has an aspect ratio (width/thickness) usually in the range of about 10 to about 1000. However, the film can be produced most easily when about 30 to about 300 in this ratio. When less than 10 in aspect ratio, the carbon film is not much different in properties from known carbon fibers having an elliptical cross section, whereas an excessively great aspect ratio is not desirable since the carbon film is liable to become distorted.

Depending on the production conditions, the structure of cross section of the carbon film produced by the present process is of the radial type (having a definite lamella arrangement from the center of the section to the surface thereof), random type (having no specific lamella arrangement in section) or onion type (having a section of concentric layers resembling onions).

Accordingly, the present invention also provides a process for producing a carbon composite material characterized by preparing a tapelike pitch carbon film by the above process, and combining the carbon film with a resin by the method already described to give a composite material.

EXAMPLES

Reference examples and examples are given below to further clarify the features of the present invention.

REFERENCE EXAMPLE 1

To coal tar pitch having a softening point of 100° C. and containing 0.2% of quinoline insolubles and 30% of benzene insolubles was added hydrogenated anthracene oil in twice the amount of the pitch, and the mixture was heated at 430° C. for 60 minutes, and the hydrogenated anthracene oil was removed in a vacuum at 300° C. to obtain reduced pitch.

Nitrogen gas was then introduced into the reduced pitch to remove low-molecular-weight components, and the pitch was thermally polymerized at 400° C. for 5 hours to obtain spinnable mesophase pitch having a softening point of 310° C., a quinoline insoluble content of 50%, a benzene insoluble content of 98% and a mesophase content of at least 90%.

EXAMPLES 1-3

The spinnable mesophase pitch obtained in Reference Example 1 was extruded into a sheet of pitch while applying air to the sheet using a nozzle of the slit type shown in FIGS. 1 to 3. The sheet of pitch was wound up while being pulled to obtain a tapelike pitch film. The film was then made infusible in air at about 300° C. and thereafter heated to 1000° C. in nitrogen gas to obtain a tapelike pitch carbon film.

Table 1 shows the production conditions and the properties of the tapelike pitch carbon film obtained.

COMPARATIVE EXAMPLE 1

A tapelike pitch carbon film was obtained in the same manner as in Example 1 except that no air was applied to the sheet of pitch being produced.

Table 1 also shows the production conditions and the properties of the tapelike pitch carbon film obtained.

The tapelike carbon film of Comparative Example 1 markedly necked down, consequently exhibiting distortion, i.e., wrinkles on the film surface, and was not usable.

TABLE 1

|  | Example 1 | Comp. Ex. 1 | Example 2 | Example 3 |
| --- | --- | --- | --- | --- |
| Size of nozzle used | 15.0 mm × 0.15 mm | 15.0 mm × 0.15 mm | 15.0 mm × 0.15 mm | 50 mm × 0.15 mm |
| Rate of supply of pitch | 5.2 g/min | 5.2 g/min | 2.6 g/min | 8.8 g/min |
| Temp. of pitch to be extruded | 340° C. | 340° C. | 340° C. | 340° C. |
| Temp. of nozzle during extrusion | 320° C. | 320° C. | 315° C. | 315° C. |
| Temp of air supplied to nozzle | 280° C. | — | 280° C. | 250° C. |
| Rate of application of air per air discharge channel | 0.4 l/min | — | 0.4 l/min | 0.5 l/min |
| Speed of air applied | 90 m/sec | — | 90 m/sec | 50 m/sec |
| Sheet winding speed | 54 m/min | 54 m/min | 8 m/min | 4 m/min |
| Size of tapelike carbon film (width × thickness) | 2.25 mm × 28 μm | 1.60 mm × 40 μm | 7.2 mm × 30 μm | 36 mm × 40 μm |
| Aspect ratio (width/thickness) | 80 | 40 | 240 | 900 |
| Type of tapelike carbon film structure in cross section | Random | Radial | Random | Onion |

EXAMPLE 4

The surface of the carbon film (28 μm in thickness and 2.25 mm in width) prepared in Example 1 was electrolytically oxidized by passing a current through the film at 10 coulombs per unit weight (1 g) of the film in a 1N aqueous solution of sulfuric acid.

Next, an epoxy resin solution was prepared by dissolving 40 parts by weight of an epoxy resin (brand name: Epikote 828, product of Yuka Shell Epoxy Co., Ltd.), 60 parts by weight of an epoxy resin (brand name: Epikote 1001, product of Yuka Shell Epoxy Co., Ltd.), and 5 parts by weight of dicyandiamide and 4 parts by weight of dichlorodimethylurea serving as curing agents in methyl cellosolve. The solution was applied to the carbon film and dried to obtain a prepreg of the carbon film. The prepreg comprised 80 wt. % of carbon film and 20 wt. % of epoxy resin.

The prepreg was made into a 30-ply longitudinal laminate having a thickness of 1 mm, with pieces of the carbon film oriented in the lengthwise direction, and the laminate was formed by autoclave molding in an autoclave for curing at an elevated temperature of 125° C. and at an increased pressure of 3 kg/cm$^2$ for 2 hours. The carbon composite material obtained had a carbon film content (vol. of 85% and checked for characteristics with the results given in Table 2.

COMPARATIVE EXAMPLE 2

Using polyacrylonitrile carbon fibers (brand name: T300, product of Toray Co., Ltd.) and the epoxy resin solution of Example 4, a prepreg was prepared in which the carbon fibers were arranged in parallel in one direction and weighed 100 g per unit area, i.e., per m$^2$.

The prepreg was made into a 1-mm-thick 10-ply laminate, with the axes of carbon fibers arranged in one direction, and the laminate was treated in the same manner as in Example 4 to obtain a composite material. The composite material obtained had a carbon fiber content (vol. %) of 71%. Table 2 shows the properties of the composite material determined.

In Table 2, $\sigma L$ represents the tensile strength (MPa) of the material in the lengthwise direction of the carbon film or in the direction of the carbon fiber axes, and $\sigma T$ represents the tensile strength (MPa) of the material in the widthwise direction of the carbon film or in the direction orthogonal to the carbon fiber axes. The tensile strength was measured according to ASTM D3039-76 (Reapproved 1982).

TABLE 2

|  | Example 4 | Comp. Ex. 2 |
| --- | --- | --- |
| $\sigma L$ | 800 | 1500 |
| $\sigma T$ | 80 | 50 |
| $\sigma L/\sigma T$ | 10/1 | 30/1 |
| Voids (%) | 1 | 5 |

Table 2 reveals that the use of the carbon film provides a carbon composite material of diminished anisotropy.

The carbon composite material of Example 4 was almost free from voids and uniform, whereas the composite material of Comparative Example 2 had many voids.

We claim:

1. A process for producing a tapelike pitch-based carbon film characterized in that spinnable pitch is extruded from a nozzle having a slit into a sheet of pitch, which is then pulled by and wound on a take-up device, made infusible and carbonized, wherein gas streams having a temperature of about 200° to about 400° C. and having an outward component and a downward component are applied to the sheet of pitch being reduced in width by the pull in the vicinity of widthwise opposite ends thereof before the sheet fully solidifies, in directions symmetric with respect to a phantom plane extending through a central point of the slit and perpendicular to a plane in the lengthwise direction of the slit, to prepare a tapelike pitch film, which is made infusible and carbonized, and wherein the resulting carbon film has an aspect ratio of about 10 to about 1000.

2. A process as defined in claim 1 wherein the gas streams are applied symmetrically with respect to the phantom plane from at least two locations to both surfaces of the sheet of pitch in the vicinity of widthwise opposite ends thereof.

3. A process as defined in claim 1 wherein the gas streams to be applied have a temperature of about 250 to about 350° C.

4. A process as defined in claim 1 wherein the gas streams are applied at a speed of about 50 to about 100 m/sec (as measured at outlets of gas discharge channels).

5. A process as defined in claim 1 wherein the gas stream is applied at a rate of about 0.4 to about 0.5 liter/min per gas discharge channel.

6. A process as defined in claim 1 wherein the spinnable pitch is mesophase pitch or mesophase pitch containing isotropic pitch.

7. A process as defined in claim 1 wherein the resulting carbon film is a mesophase pitch-based carbon film having a thickness of about 10 to about 40 μm.

8. A process as defined in claim 1 wherein the resulting carbon film is a mesophase pitch-based carbon film having a thickness of about 10 to about 40 μm and an aspect ratio (width/thickness) of about 30 to about 300.

9. A process as defined in claim 1 wherein the tapelike pitch film has a thickness of about 12 to about 50 μm and a width of about 2 to about 45 mm.

* * * * *